United States Patent [19]
Fencl et al.

[11] 3,850,017
[45] Nov. 26, 1974

[54] TRUCK RIM EDGE DEBURRING APPARATUS

[75] Inventors: Vernon Fencl, Northbrook; Alberts Roze, Chicago, both of Ill.

[73] Assignee: Grotnes Machine Works, Inc., Chicago, Ill.

[22] Filed: Nov. 12, 1973

[21] Appl. No.: 414,704

[52] U.S. Cl............................ 72/70, 72/109, 72/199, 83/914
[51] Int. Cl.............................................. B21h 1/10
[58] Field of Search ........... 72/70, 71, 86, 109, 111, 72/124, 199, 80; 29/159.1; 90/24 C; 83/914

[56] References Cited
UNITED STATES PATENTS

| | | | |
|---|---|---|---|
| 307,217 | 10/1884 | Munton | 72/109 |
| 2,425,986 | 8/1947 | Bohm | 72/70 |
| 3,797,431 | 3/1974 | Yoshimura | 83/914 |

*Primary Examiner*—Lowell A. Larson
*Attorney, Agent, or Firm*—Wolfe, Hubbard, Leydig, Voit & Osann, Ltd.

[57] ABSTRACT

An apparatus for removing sharp corners and deburring the end edges of cylindrical truck rims having a generally horizontal operating station for receiving the rim and a vertical column carrying a pair of spaced apart V rolls. The V rolls are mounted for slidable movement in the vertical direction on the column and actuator means to apply pressure with the V rolls on the rim ends. The rolls are rotatably driven to subject the entire rim periphery to the rolling action. Cantilever mounted scrapers remove burrs at the end peripheries of the rim.

5 Claims, 5 Drawing Figures

TRUCK RIM EDGE DEBURRING APPARATUS

BACKGROUND OF THE INVENTION

The present invention relates generally to apparatus for finishing and deburring edges of cylindrical shells produced for truck rims on a continuous mass production basis following the initial operations of forming the cylindrical shape from a pre-cut length of workpiece stock, preparing the cylindrical article for welding and then welding the edges. More particularly, the invention concerns apparatus for removing sharp corners on the peripheral edges at the outer ends of the formed rim article.

RELATED APPLICATIONS

Vernon Fencl and Hans R. Luedi application Ser. No. 414,705 filed Nov. 12, 1973 on Automatic Truck Rim Weld Cleanup Process.

DESCRIPTION OF THE INVENTION

There is disclosed and claimed in the aforementioned Vernon Fencl et al. U.S. application Ser. No. 414,705, a process for finishing or cleaning the welded area of shells for truck rims manufactured on a continuous mass production basis following the initial operations of forming the cylindrical shape from a pre-cut length of workpiece stock, preparing the cylindrical article for welding and then the welding itself.

As disclosed in the Fencl et al., application, truck rims, as contrasted to automobile wheels that may be fabricated from flat sheet stock, are more desirably manufactured from a formed or shaped stock that in its "flat" or undeveloped state already includes the cross sectional configuration of the finished truck rim. Such stock is so used because a lesser overall final weight of the truck rim can be obtained by having thicker sections in the areas where greater stress will be encountered and thinner sections provided where minimum or low stress areas occur.

Since the forming operation starts out with an elongated length of pre-formed metal which is coiled or otherwise formed generally into the cylindrical shell the ends as the article leaves the coiler are warped or flared out. Thus, further forming, edge shearing and closing operations are required to prepare the cylindrical shell for welding. After welding, such as by flash butt welding apparatus, there is an excess of weld material projecting outwardly from the inner and outer peripheral side walls as well as the end shell. of the sheel.

In the aforementioned Fencl et al. application, the procedure for cleaning and finishing the weld area includes trimming the inner and outer side wall weld projections, machining the ends to remove the end projections, deburring the edges of the shell ends and coining the weld area in the side wall.

Accordingly, it is a general aim of the present invention to provide an improved edge deburring apparatus which is characterized by the ability to remove sharp edges at the ends of the formed rim articles while achieving the desired rates of mass production lines.

Another object of the invention is to provide an apparatus for deburring and finishing the edges of the welded truck rim shell which is completely automatic in operation and capable of rapidly and efficiently performing the deburring operations even on a variety of different sized rim shells.

Other objects and advantages of the invention will become apparent as the following description proceeds, taken in conjunction with the accompanying drawings.

DESCRIPTION OF THE DRAWINGS

FIG. 3 is a transverse sectional view taken substantially along the line 3—3 in FIG. 2;

FIG. 4a is an enlarged fragmentary sectional view of the workpiece rim upper portion illustrating the sharp edges and burr prior to operation with the apparatus of the present invention; and FIG. 4b is a fragmentary sectional view similar to 4a illustrating sharp edge removal, but prior to the deburring with the present apparatus.

Figure 1:
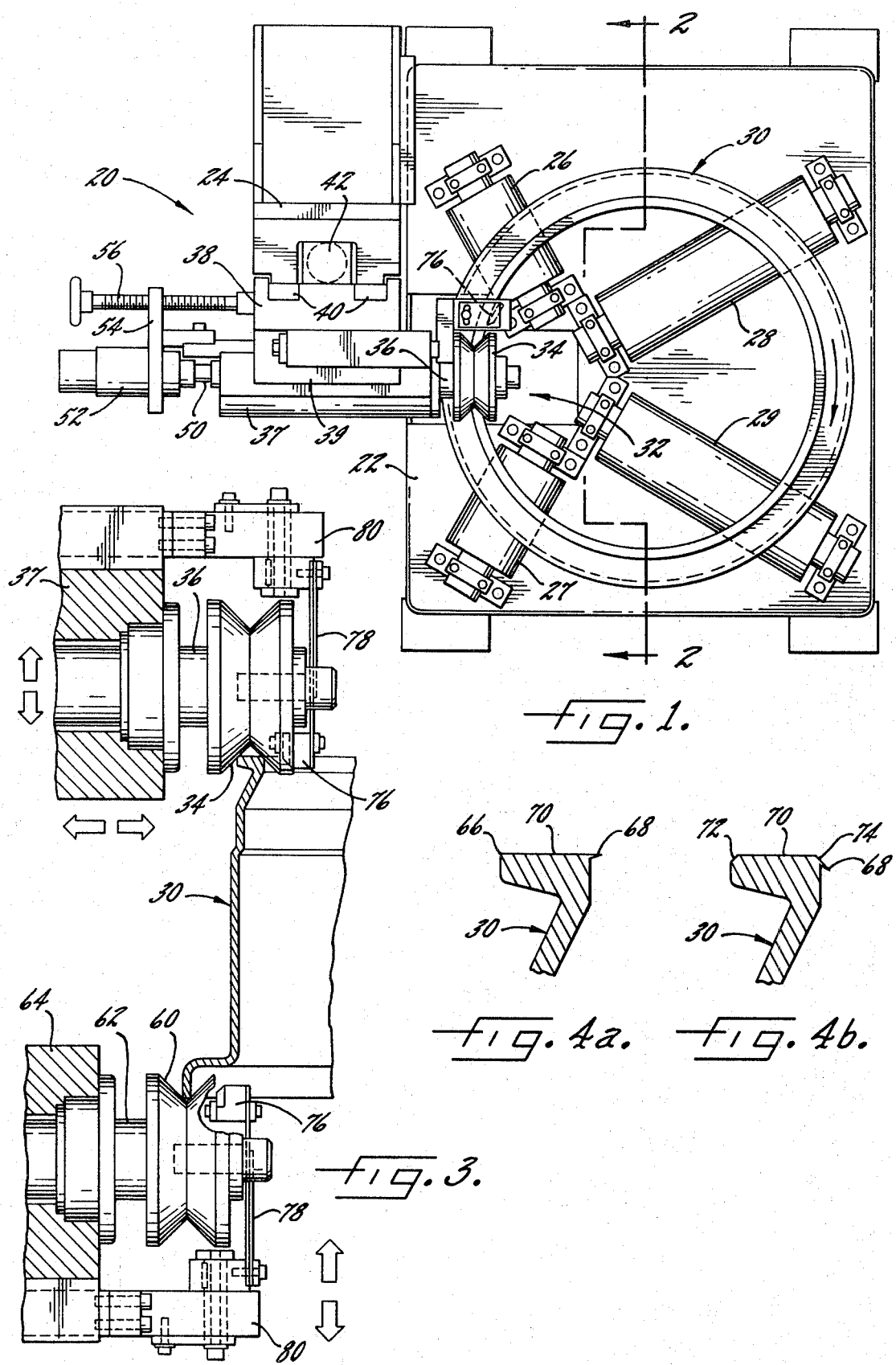
FIG. 1 is a top plan view of a deburring apparatus constructed according to the present invention.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Figure 2:
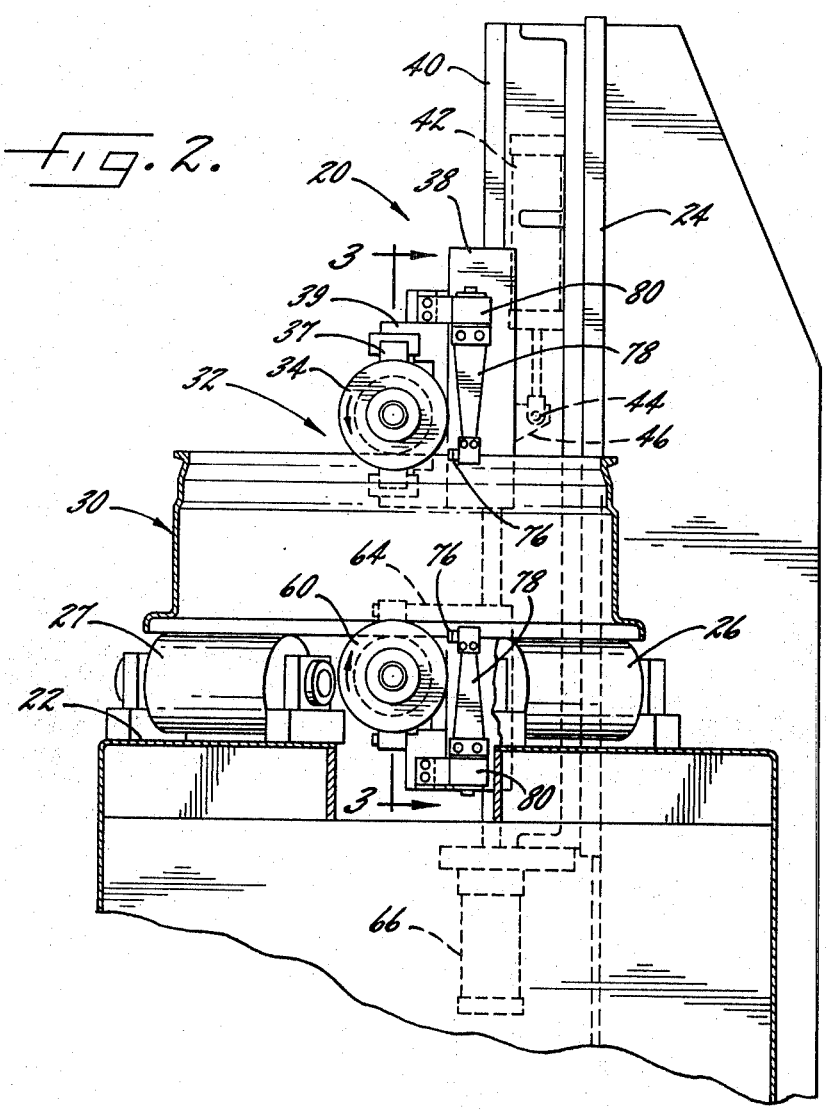
FIG. 2 is a fragmentary transverse sectional view taken substantially along the line 2—2 in FIG. 1.

Referring to the drawings, as shown in FIGS. 1 and 2 conjointly, the exemplary deburring apparatus, generally indicated at 20, includes a frame having a horizontal table portion 22 and a vertical column 24 extending upwardly above the table. Mounted on the top surface of the table 22 are a plurality of idler rolls 26–29, there being four in number with rolls 26, 27 being shorter in length than rolls 28, 29. The arrangement is such that a cylindrical rim 30 brought into the work station 32 rests on the rolls 26–29 and the rim may be easily rotated in position.

In accordance with the present invention, a pair of V-shaped rolls engage opposite ends of the rim 30 under pressure and the rolls are driven to rotate the rim between the rolls. To this end, an upper V-shaped roll 34 is carried by a spindle 36 held in a cross slide 37 by a vertical slide member 38 which is mounted for vertical movement along guideway 40 of vertical column 24. As shown in FIG. 2, a fluid actuator 42 mounted to the column 24 has an actuator rod 44 coupled to a connecting member 46 attached to slide 38.

In order to drive the roll 34, spindle 36 passing through the cross slide member 37 is connected to a shaft 50 of motor 52 mounted with a motor support 54 on the outboard side of the slide 37. The slide 37 in turn is carried by a U-shaped mount 39 fixed to the vertical slide 38. The arrangement is such that the roll 34 with its spindle 36 and cross slide 37 are permitted a certain amount of horizontal free movement with respect to the mount 39 of slide 38. To permit adjustment of the amount of horizontal travel permitted by cross slide 37, an adjustment screw 56 threadably attached to the support 54 bears against the slide 38.

Referring to FIGS. 2 and 3, a second V-shaped roll 60 is mounted on a spindle 62 and carried by a slide member 64 that is slidably mounted on column 24, guideway 40 spaced below the roller 34. An actuator 66 controls the vertical movement of the roller 60, slide 64. In a manner similar to that of the upper roll 34, roller 60 has a motor (not shown) which rotatably drives the roll 64, but in the opposite direction from that of the driving motor 52 for roll 34.

As illustrated in FIG. 4a, the upper end of the rim workpiece 30 has a sharp peripheral edge 66 and an inward extending peripheral burr 68 which occurs in the area where the weld projection has been removed from the top surface 70 during a preceding weld finishing operation. The remaining inner peripheral edge of the rim is also sharp cornered like that of 66. Also, the lower end of the rim 30 has similar inner and outer sharp edged corners.

When the rim 30 to be worked on is brought into position on the rolls 26–29, actuators 42, 66 move respective slides 38, 64 together so that rolls 34 and 60 engage the respective ends of the rim 30 and apply a predetermined amount of pressure in the axial direction. The V-shaped rolls 34, 60 rotated by their respective motors cause the rim 30 to revolve while the pressure is continuously applied and the sharp corners are compressed about the entire periphery of the rim as indicated at 72 and 74 in FIG. 4b. The burr 68 is partially sheared and bent by the passage of the roll 34. The rim may be revolved through more than one revolution and preferably more than two to achieve consistency of appearance at the edges.

In accordance with another feature of the present invention, provision is made for removing the partially weakened burr 68 as the rim revolves between the rolls 34, 60. To this end, scraper members 76 cantilever mounted by resilient members 78 to mounting members 80 carried by respective slides 38, 64 are positioned so that the scraper members 76 ride against the inner surfaces of the rim adjacent the upper and lower edges (FIGS. 2 and 3).

It will be appreciated that the edge rolling and deburring apparatus 20 may be utilized with a wide variety of different width and diameter rims as well as thicknesses of edges since the rolls 34, 60 and their operating mechanisms are not restricted to a particular size rim. The upper roll 34 being transversely shiftable with respect to the axis of the rim readily accommodates rims having different amounts of radial offset such as that viewed in FIG. 3.

Moreover, guides such as upstanding rollers may be disposed in the operating station about the periphery of the rim and located on the table 22 to prevent lateral shifting if the rim is out of roundness. Such guides will serve to direct the rim to a proper path of entry to the V rolls.

We claim as our invention:

1. Apparatus for removing sharp corners on the peripheral edges at the outer ends of a formed rim for trucks and the like comprising in combination, a frame having an operating station adapted to receive the rim, column means disposed substantially parallel to the axis of the rim in said operating station, means including a pair of spaced apart V rolls carried by said column, actuator means for moving said roll means toward one another so that said V rolls engage the end edges of said rim and apply pressure thereto, and means for rotating said rolls for removing the sharp edges about the entire periphery of the rim.

2. Apparatus as claimed in claim 1 wherein said operating station includes a plurality of idler rollers for receiving the rim and permitting the rim to be rotated in the station.

3. Apparatus as claimed in claim 1 wherein one of said V roll means is slidably mounted for movement in the direction transverse to the axis of the rim.

4. Apparatus as claimed in claim 1 wherein said roll means include cantilever mounted scraper means being normally urged against the inner peripheries of the rim ends to remove burrs thereon as the rim rotates.

5. Apparatus as claimed in claim 1 wherein guide means is disposed in said operating station to direct the rim in a path toward the V rolls as the rim is rotated.

* * * * *